Patented Mar. 5, 1929.

1,704,458

UNITED STATES PATENT OFFICE.

JOSEPH R. BREHM, OF CHICAGO, ILLINOIS.

PROCESS FOR MANUFACTURING CHEESE.

No Drawing. Application filed April 6, 1926. Serial No. 100,097.

This invention and discovery relates to improved processes for manufacturing of those preserved or semi-preserved fermented milk products known as cheese and to control fermentation during such processes.

The chief objects of my invention are: (a) to provide a method for the use of hydrolyzed protein compounds as stimulators, in a degree specific, in the fermentation of milk for cheese making; (b) to provide a process for the use of bacteria sensitized to temperature and nitrogenous food requirements in the fermentation of milk for cheese making; (c) to provide a method for the control of the fermentation of milk for cheese making by controlling the amount of hydrolyzed proteins added both with and without temperature control; (d) to provide a process for the successful use of Lactobacillus acidophilus and other temperature sensitive bacteria in controlling the fermentation of milk for cheese making by means of temperature; (e) to provide a process for the successful use of Lactobacillus acidophilus as a starter for milk for cheese making; (f) to provide a method for securing an especially rapidly curing cheese of the Cheddar type by means of the addition of the products of protein hydrolysis; (g) to provide a process for the control of the amount of curing that goes on in a Cheddar cheese by controlling the amount of hydrolyzed protein products added to it. Other objects and combinations within the scope of the above as hereinafter more fully described will be evident to those skilled in the art of cheese making.

The term cheese as it is used herein is meant to include the products known as cottage cheese, Neufchâtel cheese, and cream cheese, as well as the more ripened products known as Cheddar cheese, Swiss cheese, brick cheese, and similar products.

In the manufacture of good cheese, it has long been the custom, and in keeping with good cheese makers' practice, to take a suitable quantity of fresh milk to be used in the manufacture and inoculate or seed it with certain bacteria which characteristically produce considerable quantities of lactic acid. These organisms belong, in the terminology of the day, to the class known as Streptococcus lacticus. After a suitable degree of acidity has been obtained, the milk is made to curdle by means of rennet, or it may, in the judgment of the maker for some kinds of cheese, be allowed to ferment to a degree where coagulation takes place by virtue of the acid developed. This degree of acidity is dependent upon the kind of cheese to be made, the temperature at which it is to be made, and other factors which the cheese maker may consider from his experience. After the milk is coagulated the whey is removed from it by draining or pressing or both and the curd is subsequently treated according to the type of cheese to be made.

My invention is to provide a process of speeding up this fermentation to a given point and then slowing up or stopping it, i. e. when the desired degree of acidity or curing is obtained.

It is characteristic of many strains of bacteria, if not all of them, that after they have been kept growing and active at certain fixed temperature within reasonable limits of say 15 to 45 degrees centigrade for a period of time of say two or three months that they acquire a definite, and in many cases a very marked selectivity for that temperature, and other conditions being the same, grow faster at that temperature than they would if such bacteria had been kept at a temperature different from that or at varying temperatures, the degree depending on the temperature difference or variation from that temperature. This is not claimed as new or a discovery, but is described in order that my invention and discoveries may be more clearly understood.

This adjustable selectivity of certain bacteria is manifest in other ways than their temperature of growth. Thus it is well known that the virulence of certain pathogenic bacteria is increased by successive passage through susceptible animals. In a method analogous to this, lactic acid bacterium growing in media containing products of certain protein decomposition processes obtains a selectivity for those products, and this selectivity is in a degree specific to the protein used and the degree and manner of decomposition. These decomposition products usually, if not always, speed the growth of the bacteria to a greater or less degree and sometimes under the proper conditions this degree is very remarkable. These protein decomposition products belong to the class of compounds known as the derived proteins and include proteins, metaproteins, proteoses, peptones, and peptids, and the digestion may advantageously proceed to the point where amino acids are produced.

If, then, a culture of lactic acid bacteria which has been kept growing for some time in an ordinary sterile milk media, be transferred to a milk media containing the above mentioned products of protein hydrolysis the growth rate of the organism will be speeded up to a degree dependent upon the nature and concentration of the mixture of these products other conditions as initial acidity and temperature being the same. If this culture then be kept growing in this hydrolyzed protein media by means of repeated inoculations for a reasonable period of time usually not more than two or three weeks, its activity will reach a certain maximum dependent upon the strain of bacteria used and the exact nature of the media. After this maximum has been obtained if the organism is again caused to grow in ordinary sterile milk media, it will be found that its growth rate is much slower than originally and it will require considerable numbers of successive inoculations before the original growth rate is regained. It is possible to regulate the amount of growth in this media by regulating the amount of the added protein decomposition products. The proper amount to add to a given quantity of milk depends upon the amount of fermentation that is desired to take place. This process depends in part upon the properties of those derived proteins known commercially as peptones and I will now describe the best method for the manufacture of them.

The method is to make a suspension of the protein in water and adjust the reaction to substantially a $P^H$ of 8.1, preferably using for this purpose trisodium phosphate ($Na_3PO_4$) or tripotassium phosphate ($K_3PO_4$), add about three per cent of reasonably fresh liquor pancreaticus or an equivalent amount of the dried product from it. About two and one-half per cent of chloroform, or a little toluol should be added to prevent bacterial decomposition, and the whole is then incubated for four days at 37 degrees centigrade, more or less, depending on the strength of the pancreatic extract and the purity, nature and state of division of the protein. After the digestion has taken place to a considerable degree, and substantially all of the protein rendered soluble, the chloroform or toluol is driven off on a steam bath, the reaction adjusted to $P^H$ of 7.2, the digest filtered, concentrated, and sterilized in the autoclave.

The concentration may be accomplished merely by boiling off the water preferably under reduced pressure, the resulting product differing for its intended use only in the amount of water present and may range from a fluid to a substantially dry product.

The process is not necessarily limited to digests prepared in the above manner. Ordinary commercial peptones will be found to be suitable for it, although not so satisfactory as the more digested products. Even milk which has been sterilized for twenty minutes at twenty pounds pressure in the autoclave, or until it has a decided caramel color will enhance the growth of some bacteria, namely those of the Bacillus acidophilus group, but such a process is practically useless in cheese making because of the flavor of burnt milk.

Up to the present only three sources of hydrolyzed protein have been used, namely, the digest from casein and from commercial compressed yeast, and the above mentioned Witte's peptone. These protein sources were chosen for the following reasons: casein, because it is the chief nitrogen containing constituent of milk which is the natural habitat of lactic bacteria. Yeast, because of the well known symbiosis existing between yeasts and lactic acid bacteria. And, Witte's peptone, because it is so often used in bacteriological media. Other proteins will doubtless prove as suitable. Likewise, it is possible to use other ferments than pancreatic extract. Pepsin and rennin acting in acid solution produce noticeable results. Bromelin from the pineapple and papain from the pawpaw would probably be as good as the pancreatic extract. The hydrolysis as described simply represents the best and preferred method discovered so far. The spirit and scope of my invention and discovery is intended to include other similar substances or media.

In the manufacture of cheese up to this time only those bacteria have been used as starters which are the natural inhabitants of milk, that is those belonging to the classes of Streptococcus lacticus and Bacterium bulgaricus. There is, however, another class of bacteria related very closely to the class of Bacterium bulgaricus with which this process deals, namely, the class of Lactobacillus acidophilus. This organism has of interest in the present description the characteristics of being more sensitive to temperatures below 37 degrees centigrade than either Bacterium bulgaricus or Streptococcus lacticus. There is no need to go into details as to the exact classification differences between the rod forms mentioned except to state that suitable cultures of Lactobacillus acidophilus can be obtained from the feces of breast fed babies or animals that have been fed considerable quantities of lactose or dextrin for some time. Lactobacillus bulgaricus, on the other hand, is a normal inhabitant of fairly old cheese, or milk, that has been kept for a few weeks at forty to forty three degrees centigrade. With this explanation of these factors in mind, a desirable way to use the process is described hereinafter, although owing to the immense amount of experimental work yet to be done upon it, the general method is not to be limited to this specific method or process, but to include as less desirable methods and processes and possibilities for improvement in those principles hereinbefore described, as well as in the combination now more particularly hereinafter described.

The process or method for use with the less cured cheeses such as cottage, cream and Neufchâtel is as follows: Prepare by the method described above, from either of the native proteins, a suitable hydrolyzed protein decomposition product. Grow the desired bacterium, preferably Lactobacillus acidophilus, in pure culture in sterile milk to which this hydrolyzed protein has been added in proportion representing one (1) gram of the original dried protein per one hundred (100) grams of milk. Continue to grow this organism until a maximum growth rate has been established in this medium at the desired temperature. In the case of Lactobacillus acidophilus this temperature will have to be in the neighborhood of 37 degrees centigrade. During this period inoculate to new media each time the milk is coagulated or once a day if the coagulation period is shorter than twenty-four hours.

Standardize the product solution of hydrolysis in the following manner: To 100 c. c. of milk similar to that being used in the cheese making add quantities of the solution prepresenting the following weights of the original protein: 2.0 grams; 1.5 grams; 1.4 grams; 1.3 grams; 1.15 grams; 1.0 gram; 0.9 gram; 0.8 gram; 0.7 gram; 0.6 gram; 0.5 gram; 0.4 gram; 0.3 gram; 0.2 gram; and 0.1 gram; and a control of ordinary milk. If necessary pasteurize these at 145 degrees Fahrenheit for thirty minutes or an equivalent process; cool to the desired temperature; and inoculate with 1.0 per cent of the bacterial culture described above. Incubate at this desired temperature, shake or stir vigorously and continue the incubation until the milk is coagulated. It will be found probably that several portions containing the larger amounts will coagulate in relatively rapid succession, and that there will then be a definite and well marked reduction in the rapidity of the succession. This point can be easily determined if the time of coagulation is plotted against the concentration of the hydrolyzed protein mix. The following is a graph representing a strain of Streptococcus lacticus growing in hydrolyzed yeast media for which the correct proportion represents .35 per cent of the original protein:

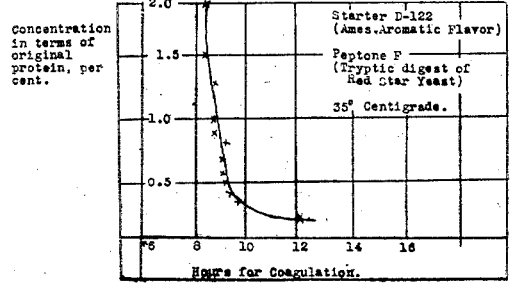

Any desired acidity either below or above the coagulation point can be obtained by following the process by titration.

A suitable quantity of milk to be used in the manufacture of the cheese is pasteurized if necessary substantially at 145 degrees Fahrenheit for thirty minutes or an equivalent process and is cooled to the desired temperature and the estimated per cent of the protein hydrolytic products solution added. The milk is then inoculated with substantially one to three per cent of a viable culture of the organism to be used that has been growing in similar hydrolyzed protein milk media and incubated for an hour at the chosen temperature. It is then stirred vigorously and allowed to coagulate or to develop the desired acidity or both if the desired acidity lies above the coagulation point. Further treatment is the usual manner of draining off the whey and has nothing to do with this description. It is assumed that the storage of the cheese will be at lower temperatures than the fermentation.

In connection with the manufacture of cured cheese of the Cheddar type, the method or process is precisely the same as for the less cured cheese products, except that an amount representing one and one-half per cent to three per cent of the original protein is used in the milk depending upon the age of the cheese desired and the nature of the hydrolyzed product. To produce the type of cheese found at the present time in commerce it is best to use Lactobacillus bulgaricus isolated from cheese of the type desired, or Streptococcus lactis or mixtures of both.

Variations from the hereinbefore described methods may be made in the strength and quantity of the substances used without departing from the scope and spirit of my invention and discovery. While only certain cheese have been named the application of my process to any and all cheeses would not be regarded as a departure from its scope.

Having thus described my invention and discovery, what I claim as new and desire to procure by Letters-Patent, is:—

1. In the fermentation of milk for cheese making a process which consists in controlling the amount of fermentation that takes place by adding hydrolyzed proteins to milk in limited amounts with and without temperature control.

2. In the art of manufacturing cheese a process which consists in mixing a hydrolyzed protein decomposition product and a milk media inoculated with a pure culture of Lactobacillus acidophilus in proportions of approximately one gram of original dried protein to one hundred grams of said milk, then growing this organism until a maximum growth rate has been established at a predetermined temperature, approximately 37 degrees centigrade inoculating to a new media each time the milk is coagulated, or once a day if the coagulation period is shorter than one day, and then applying said so prepared bacterial cultures as starters in fermenting milk, as described.

3. The process of hydrolyzing proteins which consists in mixing a suspension of protein in water, adjusting the reaction to substantially a $P^H$ of 8.1, then adding about three per cent of reasonably fresh liquor pancreaticus, then incubating the whole four days at 37 degrees centigrade, more or less, depending on the strength of said pancreatic extract together with the purity and state of the division of the protein, then sterilizing the whole in an autoclave and destroying the enzyme, as and for the purpose described.

4. In the manufacture of cheese a process as described which comprises the mixing of bacteria which have been grown for some time in media containing digested proteins with milk containing those digested proteins, for the fermentation of that milk for cheesemaking.

5. In the art of manufacturing cheese a process which comprises, mixing a hydrolyzed protein and milk, inoculating the combination with lactic acid bacteria, allowing the bacteria to grow until the desired acidity in the media is obtained and applying the whole in cheesemaking.

6. In the art of manufacturing cheese a process which comprises, mixing a hydrolyzed protein and milk, inoculating the combination with lactic acid bacteria that have been grown for some time in a similar mixture, allowing them to develop the desired acidity in the milk and applying the whole to cheesemaking.

7. In the art of manufacturing cheese a process which comprises, mixing a limited amount of a hydrolyzed protein and milk, inoculating the combination with lactic acid bacteria that have been grown for some time in media containing those hydrolyzed proteins, allowing the desired acidity to develop in that mixture and applying the whole to cheesemaking.

8. The process of manufacturing cheese consisting in mixing a limited amount of hydrolyzed protein with milk, inoculating with a culture of Lactobacillus acidophilus which has been growing for some time in milk containing hydrolyzed proteins, allowing the bacteria to grow and develop at substantially 37 degrees centigrade and applying the whole to cheesemaking.

9. A fermentable product which consists of a mixture of milk and a limited amount of a hydrolyzed protein.

10. A fermentable product which consists of a mixture of milk and a limited amount of a hydrolyzed protein and lactobacilli which have been grown for some time in media containing that protein.

In testimony whereof I have signed this specification.

JOSEPH R. BREHM.